United States Patent Office 3,508,439
Patented Apr. 28, 1970

3,508,439
COMBINATION SIDEWALL NEUTRON POROSITY AND SONIC TOOL
Robert P. Alger, Houston, Tex., assignor to Schlumberger Technology Corporation, Houston, Tex., a corporation of Texas
Filed Dec. 9, 1966, Ser. No. 600,504
Int. Cl. E21b *49/00*
U.S. Cl. 73—152
16 Claims

ABSTRACT OF THE DISCLOSURE

A specific embodiment of the invention provides a technique for measuring the porosity, matrix composition or gas saturation of an earth formation surrounding a borehole. The porosity may be determined by combining porosity-dependent signals derived from epithermal neutron radiation with the sonic transmission characteristics of the formation. The combined signals produce more accurate indication of formation porosity and also provide an indication of matrix lithology or gas saturation.

---

This invention relates to well logging methods and apparatus, and more particularly, to methods and apparatus for measuring the mineral composition, porosity and natural gas concentration in the earth formations surrounding a borehole, and the like.

The mineral composition or matrix lithology of an earth formation traversed by a borehole may be determined in a qualitative manner through several well logging techniques. Specific information, however, with regard to the relative fractions of the minerals present in the matrix is important, but often is difficult to obtain. More particularly, some borehole measurements, such as the measurement of formation porosity, tend to be inaccurate because of "matrix effects" where, for example, two minerals, such as sandstone and limestone or limestone and dolomite, are combined in the matrix in some unknown proportion.

Accordingly, a need exists for a well logging tool that can measure formation porosity more accurately. More specifically, there is a need for a quick and inexpensive technique that will provide a good indication of formation porosities and the relative proportions of the minerals present in mixed lithologies. Alternatively, where the formation porosity and the mineral composition of a formation are known precisely, a technique is needed to distinguish oil-bearing formations from natural gas concentrations.

Thus, it is an object of the invention to provide a more accurate measurement of formation porosity.

It is another object of the invention to measure the relative abundance of the minerals that comprise a mixed lithology.

It is still another object of the invention to detect natural gas in an earth formation.

In accordance with the invention, a more accurate formation porosity, the proportionate mineral composition of the rock structure, or the presence of gas, can be determined through a novel combination of formation porosity derived from neutron measurements and the sonic energy transmission characteristics of the formation.

One aspect of the invention provides a depth-related log of a signal that corresponds to the sound propagation characteristics of the earth formation surrounding a borehole. This sonic log, which preferably may be a measure of the time required for a pulse of sonic energy to traverse a known distance, is combined in a novel manner with a log of the formation porosity developed from epithermal neutron measurements at the same borehole depths. The combination provides an accurate determination of formation porosity, where the matrix is composed of a single unknown rock mineral. The relation between the neutron-derived formation porosity and the sonic transit time also indicates a corrected porosity and the relative fractions of the minerals present in a two-mineral formation, where the minerals comprising the formation are known qualitatively. Gas, moreover, is indicated through this relation by discrepancies between the computed formation composition and the relative fraction of the minerals actually comprising the formation, where these latter values are known.

A further aspect of the invention provides one well logging tool for transport through the borehole. This tool houses the sonic and the neutron equipment needed in order to make the aforementioned measurements. Because this tool, or sonde, enables all of the required data to be taken during one logging run, the time needed to log the well is more than halved in comparison with a log produced from data acquired through separate sonic and neutron logging tools.

With these and other objects in mind, the features and advantages of the present invention will be best understood from the following description when read in conjunction with the accompanying drawings. It will be understood that the description and accompanying drawings are for the purposes of illustrating a preferred embodiment and not to be construed as defining the scope or limits of the invention, reference being had for the latter purpose to the appended claims.

Referring to the drawing.

Figure 1:
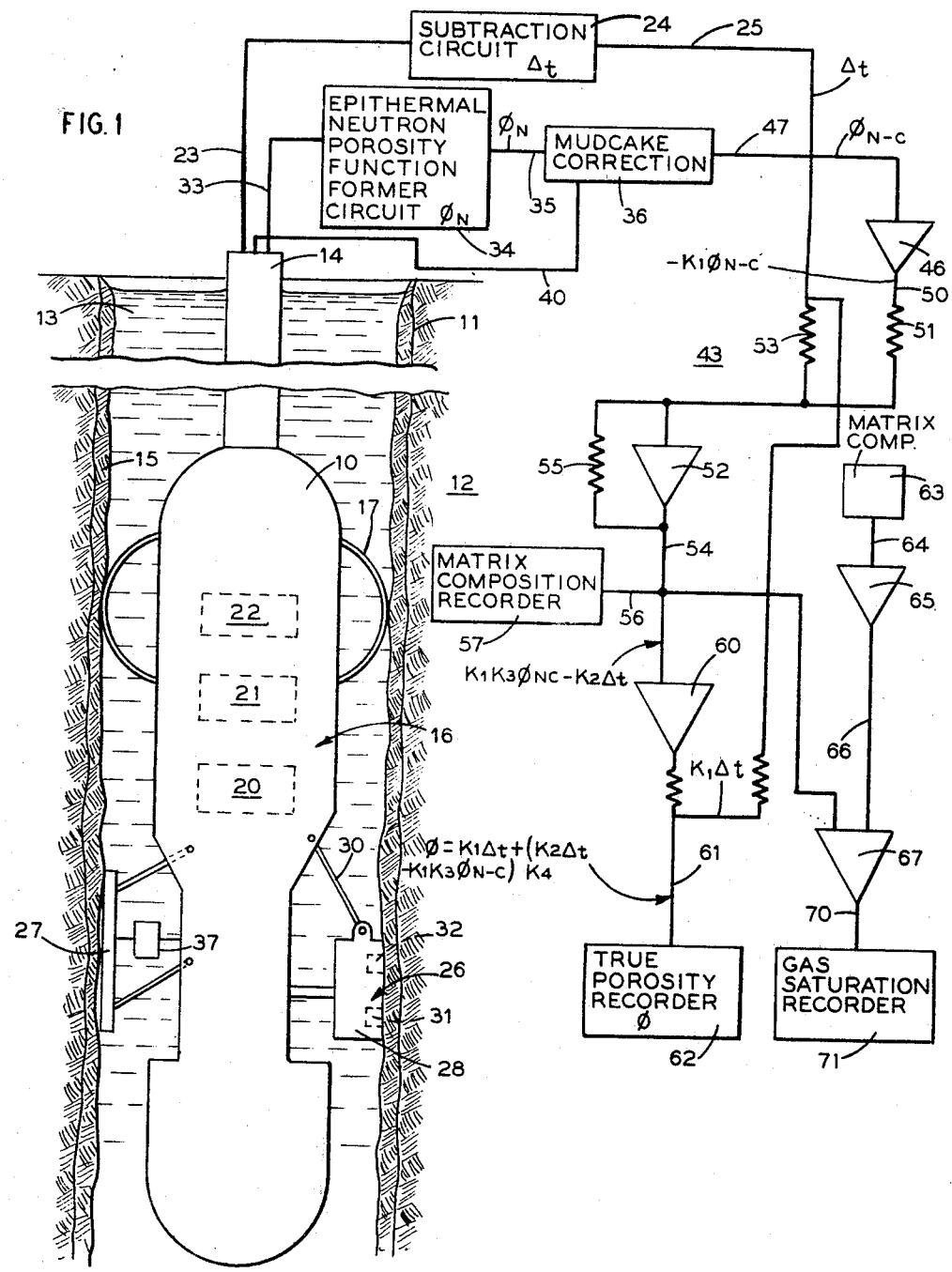
FIGURE 1 is a schematic drawing of one embodiment of a logging tool in accordance with the invention, showing the associated electrical circuits in block diagram form.

An illustrative embodiment of a practical apparatus for identifying formation porosity and matrix lithology in accordance with the principles of the invention is shown in FIGURE 1.

Accordingly, the tool comprises a fluid-tight pressure resistant housing 10 adapted to pass through a borehole 11 that traverses earth formations 12. The borehole 11 is filled with water-base or oil-base drilling mud 13, as shown. Housing 10 is suspended in the borehole 11 by an armored cable 14 which may contain a group of insulated conductors for transmitting signals to the earth's surface. A winch (not shown) located at the surface of the earth is used to lower and raise the housing in the borehole in the customary manner to traverse the earth formations 12.

Borehole 11 may be lined with a mudcake 15 which usually forms in uncased boreholes when liquids in the drilling mud invade or seep into the earth formations 12 surrounding the borehole 11 and deposit a residue of solid matter on the borehole walls. Because the mudcake 15 is a layer of material that is essentially unrelated to the formation, the mudcake 15 introduces a factor that degrades the accuracy of the borehole measurements.

The housing 10 encloses a sonic measuring device 16 which is centrally positioned along the vertical axis of the borehole 11 by means of bow springs 17, or the like. The sonic device 16 comprises a sonic energy transmitter 20 and sonic energy receivers 21 and 22. The receivers 21 and 22 are spaced vertically above the transmitter 20 at different distances in order to intercept each pulse of sonic energy from the transmitter 20 at different times. The times of each sound pulse arrival at the receivers 21 and 22 are transmitted to a substraction circuit 24 on the earth's surface through conductor 23 in the armored cable 14. The subtraction circuit 24 takes the difference between the detected pulse arrival times and applies a signal that is representative of this difference, $\Delta t$, to conductor 25. Because the $\Delta t$ signal corresponds to the sonic energy travel time through the fixed distance between the receivers 21 and 22, the signal is a measure, at least in part, of some of the characteristics of the earth formation 12, such as the speed of sound therein and the formation porosity.

In accordance with a further aspect of the invention, a skid 28, housing a neutron radiation device 26, protrudes from the sonde housing 10. The protruding skid 28 is in engagement with a wall of the borehole 11. This eccentric position of the skid 28 relative to the longitudinal axis of the borehole 11 is provided by a decentralizing arm and pad assembly 27. The decentralizing assembly 27 is pivotally mounted to a portion of the housing 10 which may be diametrically opposite to a similar decentralizing mechanism 30 that presses the skid and the neutron device 26 against the wall of the borehole 11. This eccentric position within the borehole limits the neutron device's field of observation to that part of the formation 12 and mudcake 15 that is immediately in front of the neutron device 26.

According to one embodiment of the invention, the neutron device 26 may have a neutron source 31 for continuously irradiating the adjacent earth formation 12 with fast neutrons. The source 31 may be, for example, a mixture of plutonium and beryllium that emits a satisfactory flux of high-energy neutrons. A portion of the neutrons in the formation 12 which were emitted from the source 31 are scattered back toward the neutron device 26 and are registered by a neutron detector 32. As shown in FIGURE 1, the detector 32 may be a counting tube filled with the isotope of helium having an atomic weight of 3 ($He^3$) within an electrical field established by an anode wire and a circumscribing cathode. The neutrons interact with $He^3$ nuclei to produce recoil particles that ionize the filling gas. These ionization events are recorded as charge pulses on the output electrodes (not shown) of the detector 32.

A sheath of cadmium metal (not shown) encases the detector 32 and makes the detector substantially opaque to all neutrons scattered back from the formation 12 that have energies less than .03 electron volt (ev.). Accordingly, only "epithermal" neutrons (those neutrons having energies greater than .03 ev.) are registered by the detector 32.

A signal characterizing the porosity of the formation 12 as a function of the diffusion of epithermal neutrons through the formation is transmitted from the detector 32 through a conductor 33 is the armored cable 14 to an epithermal neutron porosity function former circuit 34. The function former circuit 34 preferably may take the form of an operational amplifier circuit having resistance-diode networks connected to the input and feedback circuits thereof. The amplifier gain adjustment provided by these networks enables the amplifier to convert the signals applied to the conductor 33 into a signal on output conductor 35 that corresponds to the epithermal neutron log derived porosity $\phi_n$ of the formation 12. A more detailed description of a device of this character is described in U.S. patent application Ser. No. 588,400, filed on Oct. 21, 1966 by Harold Sherman and Jay Tittman for "Improvement in Epithermal Neutron Logging," and assigned to the same assignee as the invention described herein.

Figure 2:
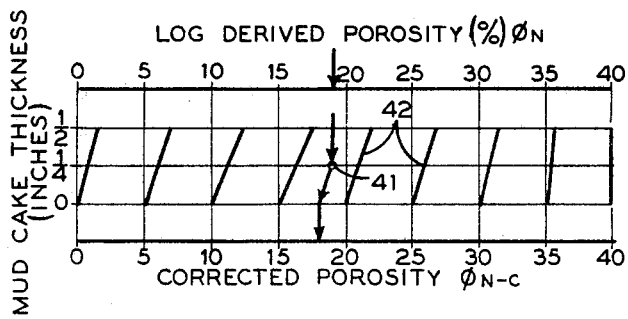
FIGURE 2 is a representative graph for correcting the neutron-derived porosity input data in accordance with borehole conditions.

If the mudcake 15 is sufficiently thick to affect the epithermal neutron data, a mudcake correction can be applied by manually of automatically adjusting the $\phi_n$ signal in the conductor 35. As shown in FIGURE 1, the $\phi_n$ signal in conductor 35 is transmitted to mudcake correction circuit 36 for automatic adjustment in accordance with the thickness of the mudcake. The mudcake thickness may be estimated on the basis of judgment and field experience or measured by means of a borehole caliper 37 associated with the decentralizing arm and pad assembly 27. The borehole caliper 37 conveniently may be a variable potentiometer which transmits a signal to the surface of the earth through conductor 40 in the armored cable 14 to the correction circuit 36. The correction circuit 36, which also may be a function former circuit of the type hereinbefore described, automatically adjusts the log derived formation porosity $\phi_n$ in accordance with the graph shown in FIGURE 2. Accordingly, the circuit 36 applies a signal to output conductor 47 that corresponds to a corrected, and hence more precise, indication of formation porosity, $\phi_{n-c}$.

Inasmuch as the sonic velocity measuring device 16 is spaced vertically from the neutron device 26, the signals from both of these devices should be normalized to a common borehole depth. Accordingly, a memorizer (not shown) stores the sonic signal $\Delta t$ until the signal from the neutron device 26 corresponds to the same borehole depth.

Figure 3:
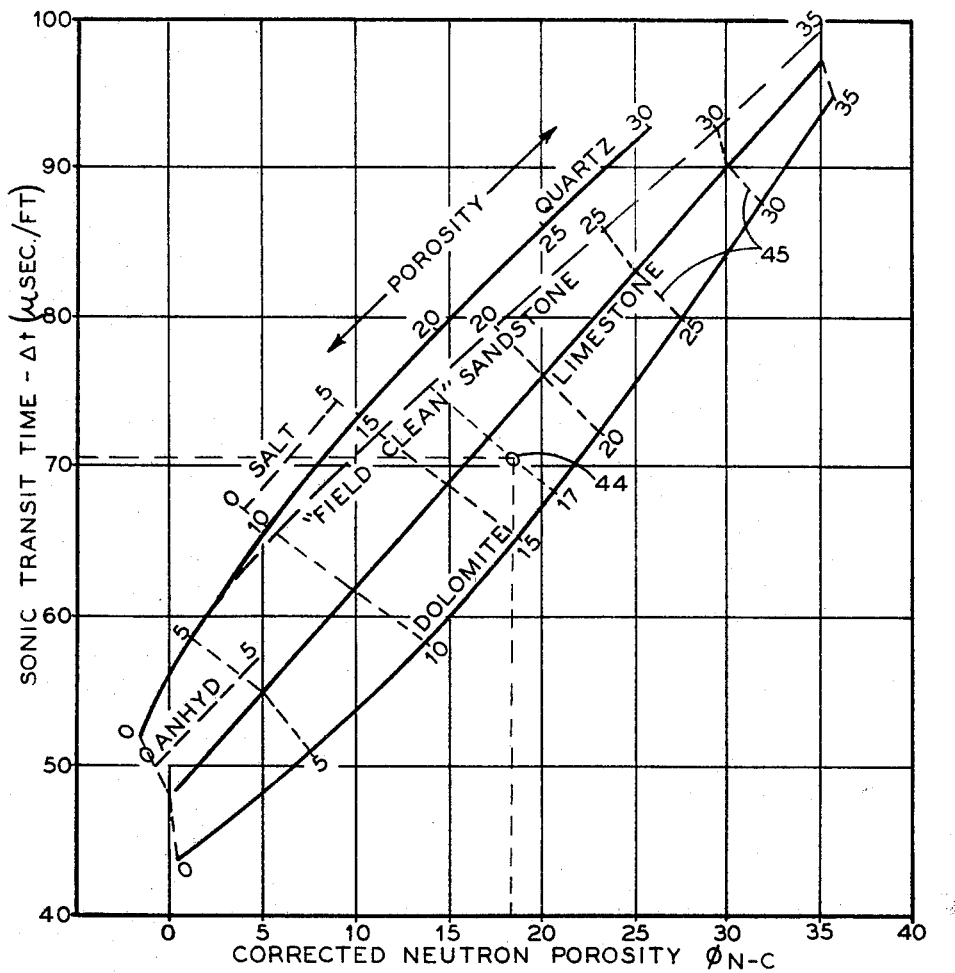
FIGURE 3 is a representative graph for combining sonic and neutron data taken in a liquid-filled borehole in accordance with the invention.

For a more complete appreciation of the principles and advantages of the present invention, FIGURE 3 shows a graph of true formation porosity, $\phi$, as a function of the corrected formation porosity $\phi_{n-c}$ and the sonic transit time $\Delta t$ in a liquid-filled borehole for salt, quartz, "field clean" sandstone, anhydrite, limestone or dolomite rock structures. The graph in FIGURE 3 was prepared with data acquired through measurements of $\phi_{n-c}$ and $\Delta t$ in formations of accurately known porosities. The graph enables the entering arguments $\phi_{n-c}$ and $\Delta t$ to be combined to produce a more precise formation porosity $\phi$, apparently because of difference in the response of the two measurements to the matrix composition.

Illustratively, the true porosity and the relative fraction of the minerals in the formation 12 are determined in the following manner. If, for example, $\phi t$ has a value of 70.5 microseconds per foot ($\mu$sec./ft.), $\phi_n$ is 19%, the thickness of the mudcake 15 is ¼ of an inch, and the matrix lithology has been determined from an examination of drill cuttings to comprise a mixture of limestone and dolomite, the mudcake correction circuit 36 corrects the log-derived porosity $\phi_n$ for the ¼ inch mudcake in accordance with FIGURE 2. Thus, the FIGURE 2, a point 41 is identified by entering the curve at the ordinate for a $\phi_n$ value of 19% in a vertically downward direction to an intersection with the ¼ inch mudcake thickness abscissa. The correction then is applied by shifting the point 41 downwardly and to the left in a direction that is generally parallel to the slanting guidelines 42 to intercept the zero thickness mudcake abscissa. The mudcake corrected porosity $\phi_{n-c}$, 18% is indicated vertically below the point of interception with the zero mudcake thickness abscissa.

In accordance with the invention, a more accurate value of formation porosity $\phi$, and an indication of the relative fractions of the dolomite and limestone present in the formation 12, is determined with the aid of the graph in FIGURE 3 or with an automatic computer 43 (FIGURE 1). Entering FIGURE 3 at the vertical ordinate that corresponds to a value of $\phi_{n-c}$ of 18%, a point 44 is identified at the intersection with the 70.5 $\mu$sec./ft. $\Delta t$ abscissa. Point 44 is approximately 70% of the distance from the dolomite curve and 30% of the distance from the limestone curve on a line of constant porosity of 17 porosity units. The position of the point 44 indicates that the true formation porosity has a value of 17 porosity units. The relative position of point 44 between the limestone and dolomite curves, moreover, indicates that the formation is comprised of approximately 70% limestone and 30% dolomite.

The porosity and fractional mineral composition of other two-mineral matrices, such as a combination of "field clean" sandstone and limestone can be determined in a manner similar to the foregoing. The term "field clean" sandstone is defined as a sandstone apparently clean on visual inspection, although small amounts of impurities such as shale, feldspar or the like may be present.

Turning once more to FIGURE 1, computer circuit 43 automatically accomplishes the foregoing porosity and matrix composition determination in the following manner. Formation porosity $\phi$ is a function of the slopes of the constant porosity lines 45 (FIGURE 3) in accordance with the equation:

$$\phi = A\Delta t + B(\Delta t - \phi_{n-c}) \quad (1)$$

where A and B are constants which can be derived from the experimental data. The computer 43 combines A, B, $\Delta t$ and $\phi_{n-c}$ into a signal that corresponds to $\phi$. More specifically, a signal corresponding to $\phi_{n-c}$ is applied to an amplifier 46 in the computer 43 through the output conductor 47 from the mudcake correction function former circuit 36. The amplifier 46 converts the $\phi_{n-c}$ input into a signal that corresponds to $-K_1\phi_{n-c}$ where $K_1$ is a constant. The $-K_1\phi_{n-c}$ signal is transmitted through a conductor 50 and an input resistance 51 to an amplifier 52 which combines the $-K_1\phi_{n-c}$ signal with the sonic transit time signal $\Delta t$. The $\Delta t$ signal is applied to the input of the amplifier 52 through the output conductor 25 and an amplifier input resistance 53.

The output signal of the amplifier 52 on the conductor 54 corresponds to the expression:

$$K_1K_3\phi_{n-c} - K_2\Delta t \quad (2)$$

where $K_2$ and $K_3$ are constants.

As the upper and lower extremes of formation porosity are approached, the gain of the amplifier 52 should vary in order to reflect changes in the slopes of the constant porosity lines 45 (FIGURE 3) as they cross the limestone curve. In ordinary logging conditions, however, a change in the response of the amplifier 52 is not necessary because the normal range of porosity interest is between 5 and 25%. As shown in FIGURE 3, the slopes of all of the constant porosity lines 45 remain substantially constant through this range. Consequently, only feedback resistance 55 is required to adjust the gain of the amplifier 52 to match the slopes of the constant porosity lines 45.

In accordance with a feature of the invention, the difference between $\phi_{n-c}$ and $\Delta t$, which characterizes the output signal from the amplifier 52, is proportional to the relative displacement of the limestone curve (FIGURE 3) from, for example, the point 44 on the 17% porosity line. The porosity difference signal in expression 2 that is applied to output conductor 54 of the amplifier 52 thereby corresponds to the relative fraction of limestone present in the earth formation 12. Accordingly, to produce an indication of the relative fraction of limestone in the formation 12, the difference signal corresponding to expression 2 is transmitted through conductor 56 to an appropriately calibrated recorder 57. The matrix composition recorder 57 may be a recording galvanometer that produces a continuous trace of the relative fraction of limestone as a function of borehole depth.

In accordance with another feature of the invention, the difference signal in the conductor 54 is transmitted to an amplifier 60 which provides an output signal corresponding to the expression $(K_2\Delta t - K_1K_3\phi_{n-c})K_4$ is one of the factors comprising the constant B in Equation 1. This output signal from the amplifier 60 is combined with a signal proportional to the value $K_1\Delta t$ to complete the electrical synthesis of the equation:

$$K_1\Delta t + (K_2\Delta t - K_1K_3\phi_{n-c})K_4 = \phi \quad (3)$$

where $K_1 = A$; $K_2K_4 = B$; and $K_1K_3 = K_2$.

The signal in the conductor 61 corresponds to the formation porosity $\phi$, and is registered in one channel of an appropriately calibrated recorder 62. The recorder 62 may be a recording galvanometer that produces a log of true porosity in terms of borehole depth.

In accordance with a further aspect of the invention, the presence of natural gas producing zones in the earth formation 12 can be identified if the relative fractions of the minerals comprising the formation matrix are known accurately.

To provide this gas identification data, the known matrix composition, which may be determined through some technique, such as examination of drill cuttings, is applied to the computer circuit 43 through a manually operated input potentiometer 63. The matrix composition signal is sent through a conductor 64 to an amplifier 65. The amplifier 65 inverts the amplitude of the matrix composition signal and produces a signal that corresponds to the negative thereof on output conductor 66. The difference signal in conductor 54 that corresponds to expression 2, computed in the manner hereinbefore described, and the negative of the matrix composition signal are combined in an amplifier 67. The output from the amplifier 67 is a signal that is equivalent to the difference between the known formation composition and the computed formation composition. The output signal from the amplifier 67 is applied to conductor 70 and provides some measure of the gas saturation in the formation 12 which may be registered in recorder 71. The recorder 71 also may be a recording galvanometer that produces a log of gas saturation as a function of borehole depth.

Thus, if the pores in the formation 12 are filled with water, oil or a combination of water and oil, the computed matrix composition and the known composition of the formation 12 should be equal. If, however, the pores in the formation 12 contain significant amounts of natural gas, the point 44 plotted in FIGURE 3 would be upward and to the left of a point plotted in accordance with the known mineral composition. In this situation, the difference between the plotted points would indicate clearly the presence of gas in the formation.

If the formation is comprised of only one unknown mineral, this mineral may be identified readily by a signal that corresponds to a zero difference in expression 2 or by the position of a point plotted on one of the curves in FIGURE 3 for a specific mineral, in response to observed values of $\phi_{n-c}$ and $\Delta t$.

It will be obvious to those skilled in the art that various changes and modifications may be made therein without departing from the invention, and it is, therefore, intended to cover all such changes and modifications as fall within the true spirit and scope of the invention.

What is claimed is:

1. A well-logging system for measuring the porosity of an earth formation traversed by a borehole comprising sonic energy means for producing a signal that corresponds to a characteristic of the earth formation, neutron radiation means for producing another signal that corresponds to a characteristic of the earth formation, and circuit means for combining said signals to produce still another signal that indicates the porosity of the earth formation.

2. A well-logging system according to claim 1 comprising centering means for positioning said sonic energy means in the middle of the borehole approximately equidistant from the earth formation traversed thereby, and decentralizing means for urging said neutron radiation means against the earth formation.

3. A well-logging system according to claim 2 wherein said neutron radiation means comprises a source of neutrons for irradiating the earth formation, and a neutron detector responsive to said irradiating neutrons that have epithermal energies.

4. A well-logging system according to claim 2 wherein said sonic energy means comprises a sonic energy transmitter, and a plurality of sonic energy receivers spaced at different distances from said transmitter.

5. A well-logging system for measuring the relative fractions of the minerals in an earth formation matrix comprising sonic energy means for producing a first signal characterizing sound propagation within the earth formation, neutron radiation means for producing a second signal that characterizes the earth formation porosity, and circuit means for combining said signals to indicate the relative fraction of at least one of the minerals in the earth formation.

6. A well-logging system according to claim 5 comprising further circuit means for combining said two signals to produce still another signal that corresponds to the porosity of the earth formation.

7. A well-logging system for identifying natural gas in an earth formation of known mineral composition comprising neutron radiation means for producing a first signal characterizing the formation porosity, sonic energy means for producing a second signal characterizing sound propagation within the earth formation, circuit means for producing a third signal that corresponds to the known mineral composition, and further circuit means for combining said first and second signals with said third signal to indicate natural gas within the formation.

8. Apparatus for measuring the porosity of an earth formation surrounding a borehole comprising a sonic energy device for measuring sound propagation within the earth formation, a neutron irradiation device responsive to epithermal neutrons for measuring the porosity of the earth formation, biasing means for urging said neutron irradiation device against the earth formation, centering means for positioning said sonic energy device within the borehole substantially equidistant from the surrounding earth formation, and circuit means responsive to said sonic and neutron measurements for producing a signal that corresponds to a more accurate indication of the earth formation porosity.

9. Apparatus for measuring earth formation porosity according to claim 8 wherein said neutron irradiation device comprises a source of neutrons for irradiating the earth formation, and a detector responsive to those irradiating neutrons that have epithermal energies.

10. Apparatus for measuring the relative fraction of the minerals in an earth formation of qualitatively known composition comprising a sonic energy device for measuring sound propagation within the earth formation, a neutron device responsive to epithermal neutrons for measuring the diffusion and absorption characteristics of neutrons within the earth formation, and further circuit means for combining said earth formation measurements to produce a signal that corresponds to the relative fraction of at least one of the minerals in the earth formation composition.

11. Apparatus for measuring the relative fractions of minerals in an earth formation according to claim 10 wherein said further circuit means comprise computer means for combining said sonic and neutron measurements to produce a signal that corresponds to the porosity of the earth formation.

12. Apparatus for indicating natural gas in an earth formation having a known mineral composition comprising a sonic energy device for measuring sound propagation through the earth formation, a neutron radiation device responsive to epithermal neutrons for measuring the diffusion of neutrons through the earth formation, circuit means for producing a signal that corresponds to the known mineral composition, and further circuit means for combining said composition signal with said sonic and neutron measurements to indicate natural gas in the earth formation.

13. A well-logging device for determining accurately the porosity of an earth formation comprising a housing for traversing the earth formation, a skid operatively connected to said housing for engagement with the earth formation, a neutron source within the skid for irradiating the formation with neutrons, an epithermal neutron detector within the skid for sampling said neutrons that diffused through the formation, circuit means responsive to said epithermal neutron detector for producing a signal that corresponds to the porosity of the earth formation, a sonic energy transmitter within the housing for applying pulses of sonic energy to the earth formation, at least two sonic energy receivers within said housing spaced from said transmitter and the earth formation for detecting at least one of said sonic energy pulses at different times, further circuit means responsive to said sonic energy receivers to produce a signal that corresponds to the time difference between said detected sonic energy pulse, and a formation porosity circuit for combining said porosity signal and said time difference signal to produce still another signal that corresponds to a more accurate determination of the earth formation porosity.

14. Apparatus for determining earth formation characteristics comprising sonic energy means for producing a signal that corresponds to a characteristic of the earth formation, neutron radiation means for producing another signal that corresponds to a characteristic of the earth formation, and circuit means for combining said signals to produce still another signal that indicates a characteristic of the earth formation.

15. Apparatus for determining earth formation characteristics according to claim 14 comprising centering means for positioning said sonic energy means in the borehole approximately equidistant from the earth formation traversed thereby, and decentralizing means for urging said neutron radiation means against the earth formation.

16. Apparatus for determining earth formation characteristics according to claim 14 comprising a source of neutrons for irradiating the earth formation, and a neutron detector responsive to said irradiating neutrons that have epithermal energies.

References Cited

UNITED STATES PATENTS

| | | | |
|---|---|---|---|
| 3,127,950 | 4/1964 | Itria | 73—152 X |
| 3,181,645 | 5/1965 | Blizard. | |
| 3,221,548 | 12/1965 | Wilson | 73—152 |
| 3,320,803 | 5/1967 | Lord | 73—152 |

RICHARD C. QUEISSER, Primary Examiner

J. W. MYRACLE, Assistant Examiner